Oct. 20, 1970     J. L. WESSEL     3,534,977
UNIVERSAL CROSSMEMBER FOR LADDER-TYPE VEHICLE FRAME
Filed Aug. 8, 1968
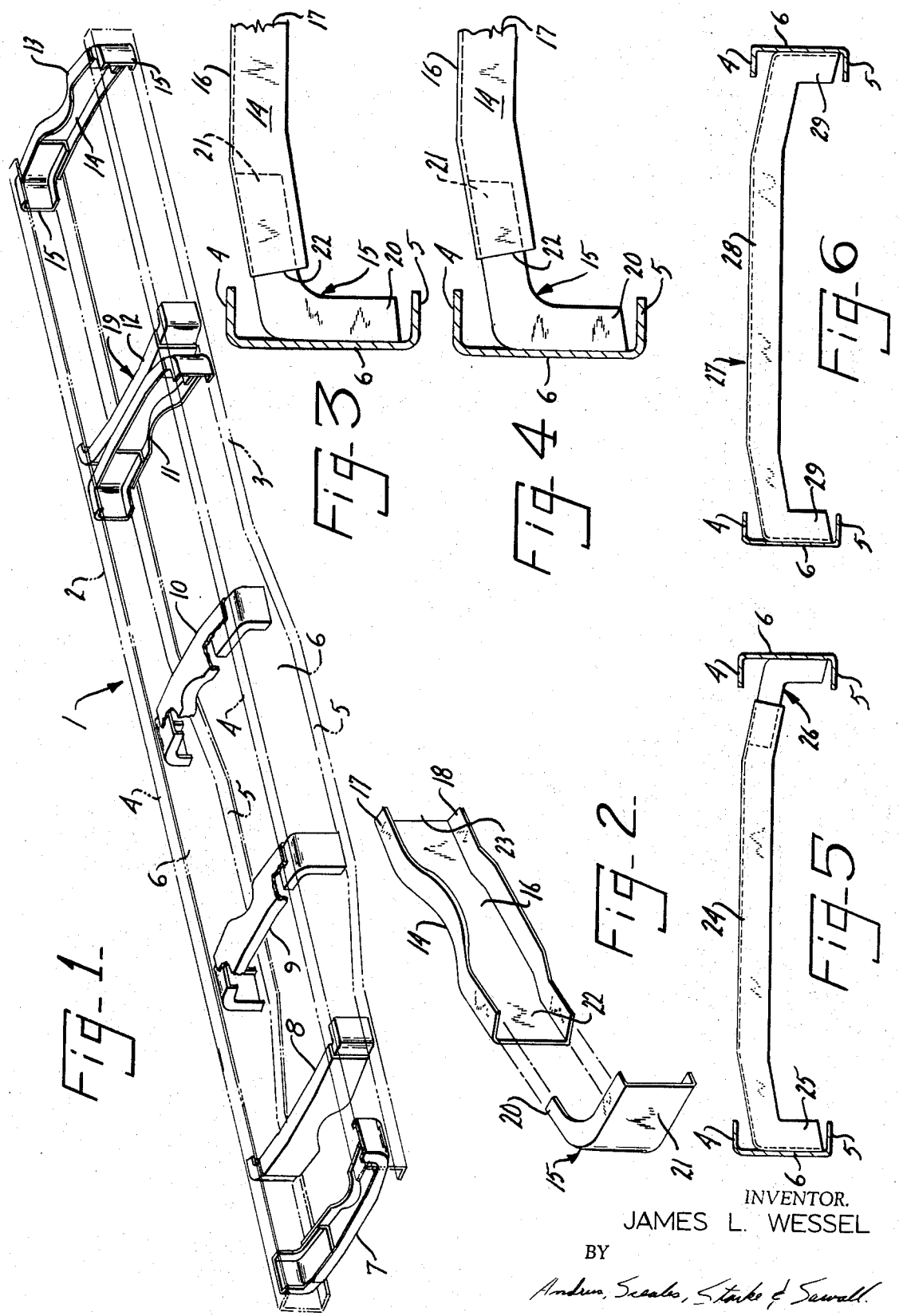
INVENTOR.
JAMES L. WESSEL
BY
Attorneys

United States Patent Office 3,534,977
Patented Oct. 20, 1970

3,534,977
UNIVERSAL CROSSMEMBER FOR LADDER-TYPE VEHICLE FRAME
James L. Wessel, Delafield, Wis., assignor to A. O. Smith Corporation, Milwaukee, Wis., a corporation of New York
Continuation-in-part of application Ser. No. 663,346, Aug. 25, 1967. This application Aug. 8, 1968, Ser. No. 751,114
Int. Cl. B62d 21/00
U.S. Cl. 280—106
9 Claims

ABSTRACT OF THE DISCLOSURE

A universal crossmember comprising an intermediate channel member and a pair of generally L-shaped end members adapted to fit together with the channel member in various orientations and assemblies to accommodate the crossmember to all required crossmember applications in a ladder-type vehicle frame. For added strength, two of said crossmembers can be assembled back-to-back. This latter combination provides greater resistance to frame parallelogramming. The universal crossmember makes possible the use of the same forming tools in many applications for all crossmember parts in a ladder-type vehicle frame.

---

This application is a continuation-in-part of an application by the same inventor, identified as Ser. No. 663,346, filed Aug. 25, 1967, now abandoned and entitled Universal Cross-Member for Ladder-Type Vehicle Frame.

Many vehicle frames of the ladder-type have variable width, variable depth siderails. One of the prime considerations in the cost of a vehicle frame is the tooling expense connected with the forming of each individual part in the frame design. There are many reasons requiring non-uniform vehicle frame elements. For example, in some applications, the vehicle engine may be so large as to require a frame crossmember that bellies downwardly under the engine. In another application location, it may be necessary that the crossmember extend up to the level of the top surface of the siderails, for example, under the trailer. If the vehicle siderails converge or separate at any area along their length, the crossmember at each location where the siderails converge or separate must be of a different length than at the other locations. In the past, each of the above applications has ordinarily required a specifically formed crossmember made with separate tooling.

Applicant has eliminated the tooling cost for these different applications by means of the universal crossmember of the subject invention. The subject crossmember is adaptable to numerous applications, including all of those set forth above. In one preferred embodiment, the L-shaped end members have legs of unequal length to accommodate the end members to mounting locations requiring either length leg as a mounting means. When the correct mounting orientation has been determined, the two L-shaped end members and the required intermediate channel member can be assembled together and secured permanently, such as by welding, to provide the particular crossmember part required.

In the second embodiment, only one adjustable L-shaped member is required, and it is used in combination with a channel member having one L-shaped integral end. This two-piece design will also provide the desired width and depth variability. Depth variability is obtained in the channel member by employing form tools that will accept more than one length of end flange.

For some uses, as where the crossmember length need not be varied or where only simple changes in the L-shaped ends are ever desired, a one-piece construction may be employed. The drawings illustrate the invention in more detail.

FIG. 1 of the drawings is three-quarter perspective view of a ladder-type frame showing the universal crossmember in a plurality of applications, and with the frame siderails shown in phantom;

FIG. 2 is a perspective view showing one L-shaped end member and an intermediate crossmember just prior to assembly;

FIG. 3 is a plan view with parts broken away and shows one possible assembly of the L-shaped end member in a first orientation with the intermediate crossmember;

FIG. 4 is a plan view with parts broken away and shows another possible assembly of the L-shaped member with the intermediate crossmember to provide a longer universal crossmember than shown in FIG. 3; and FIG. 5 is a plan view showing a second embodiment of the invention utilizing a two-piece concept.

FIG. 6 is a plan view showing a third embodiment of the invention.

As shown in the drawings, a ladder-type vehicle frame 1 comprises a pair of long complementary channel member siderails 2 and 3, which are disposed generally parallel to each other with the respective flange edges 4 and 5 facing each other. The webs 6 of each siderail 2 and 3 are shown for illustration purposes as being of varying depth throughout their lengths.

The channel member siderails 2 and 3 are secured together throughout their lengths by means of a plurality of universal crossmembers 7–13, as shown in FIG. 1. The crossmembers 7–13 are shown in a plurality of orientations to adapt the members to a particular application at a particular location on the vehicle frame 1. For example, in the rear suspension region, which is normally subjected to the greatest loads in a truck, a pair of crossmembers 11 and 12 are disposed back-to-back to provide double strength reinforcement to this portion of frame 1. The inverted crossmember 7 provides the required clearance above it for the engine or other vehicle parts. The crossmember 8 is oriented to allow clearance for transmission or driveline components thereunder. The other crossmembers 9, 10 and 13 are also shown in different possible orientations to indicate the universality of the applications for the crossmembers 7–13.

Referring now to FIG. 2, each crossmember 7–13 comprises two basic parts, that is, an intermediate crossmember 14 and an L-shaped end member 15. Two identical end members 15 are assembled with a single intermediate crossbar to 14 to define the crossmembers 7–13 of the frame 1.

As seen in FIG. 2, the crossbar 14 comprises a generally channel-shaped member having a web 16 and a pair of flanges 17 and 18. the crossbar 14 is of any required metal thickness, as determined by the structural requirements of the vehicle frame 1. The upper flange 17 in FIG. 2 has a convolution which is shown to be a concave portion to adapt it to the orientation of crossbar 13 as seen in FIG. 1 and also for use as crossbars 11 and 12, which cooperatively define a double strength crossbar 19. As can be seen in FIG. 1, the crossbar 19 is so oriented that the rear transmission elements or driveline (not shown) can pass under it.

The member 15 comprises a single, stamped, L-shaped channel which has a first, shorter leg 20 and a somewhat longer leg 21. The member 15 is adapted to fit inside the first end 22 of the crossbar 14 shown in FIG. 2 to define universal crossmembers 7–13, when a second member 15 is similarly inserted at the second end 23 of the crossbar 14. The assembled crossbar 14 and members 15 are secured together, such as by welding or any other means (not shown).

FIGS. 3 and 4 of the drawings illustrate two possible changes that can be made in the assembly of crossbar 14 with the member 15. Other changes in their assembly are shown generally in FIG. 1.

In FIG. 3, a shorter crossmember 7–13 is obtained by providing a larger overlap between members 15 and crossbar 14 prior to welding the three parts together. FIG. 4 shows a longer crossmember 7–13 because a shorter overlap is provided between the members 15 and the crossbar 14. It also is evident that in the portions of the frame 1 where the web 6 of the siderails 1 and 2 are deeper, such as crossmember 9, the L-shaped member 15 can be reoriented so that the longer leg 21 is disposed against, and welded to the web 6 of the frame siderails 2 and 3.

In a second embodiment of the invention, as illustrated in FIG. 5, a channel member 24, having an L-shaped integral end 25 is used in combination with an L-shaped end member 26 which is similar to the L-shaped end members 15. Variability in the length of end 25 is obtained by the use of form tools which will accept more than one length of flange. The L-shaped end member 26 is simply reversed to obtain a different length.

A single member embodiment is shown in FIG. 6 having a crossmember 27 of configuration generally corresponding to members 7–13. The universal crossmember has a channel member 28 integrally connected to end legs 29, which are shaped correspondingly to end members 25 of the second embodiment.

Crossmember 27 is advantageously utilized within a vehicle frame designed to allow the use of crossmembers of uniform length. While not being adjustable lengthwise after the members are manufactured, the shape of channel member 27 permits the various orientations shown for the three-piece unit in FIG. 1 and thus includes the advantages of that feature of the invention. Additionally, some variation in size may be provided by manufacturing legs 29 in alternate lengths to fit different siderails 2. This can be done with a change of only one die and does not materially expand the costs involved.

Other embodiments of the invention could employ two or more lengths of the one-piece member 27, having the same configuration as channel member 28. As for the embodiments described above, several of the members of each length can be connected to siderails 4 in different orientations thereto and, thus, minimize the tooling costs and assembly difficulties.

SUMMARY

The universal crossmember described above can be assembled in a variety of orientations to facilitate manufacture by eliminating tooling costs for a number of different crossmember configurations. The present invention uses a minimal number of stamped parts, assembled in many ways to replace the formerly required plurality of differently shaped crossmembers.

Various modes of carrying out the invention are contemplated as being within the scope of the following claims particularly pointing out and distinctly claiming the subject matter which is regarded as the invention.

I claim

1. A vehicle frame having a pair of generally elongated channel siderails and a plurality of reinforcing channel crossmembers, several of the crossmembers being formed substantially identically, each of several crossmembers having two ends and having substantially identical channel crossbar portions between said ends, said several crossmembers each being adaptable to be disposed in a plurality of preselected orientations with respect to the siderails, and said crossbar portions having a convolution which provides a different clearance for vehicle parts disposed adjacent the frame for each of said preselected orientations, and each of said several crossmembers having substantially identical channel angled leg portions extending from the two ends of the crossbar and being dimensioned to be fitted within the channel siderails in any of said preselected orientations.

2. The article of claim 1, wherein said convolution comprises a concave portion disposed in the web and one of the flanges of said several crossmembers, said concave portion being disposed a predetermined distance from one end of the crossbar portion and adapted to provide different clearances in different preselected orientations and to remain inoperative in the other orientations.

3. The article of claim 1, in which a plurality of said identical crossmembers are combined back-to-back to define a single, wider and stronger crossmember.

4. The article of claim 1, in which all of the crossmembers are constructed substantially identically and the crossmembers are connected to the siderails only at points where the siderails are spaced substantially the identical perpendicular distance apart, generally corresponding to the lengthwise dimension of the crossbar portion of said crossmembers.

5. A universal crossmember for a vehicle frame having a pair of generally elongated channel siderails opening inwardly and a plurality of reinforcing crossmembers, each crossmember comprising three generally identical components including a generally channel-shaped crossbar adapted to be disposed in a plurality of preselected orientations with respect to said siderails, and a pair of identical generally L-shaped channel end members, each having a first leg adapted to be attached to a respective end of said crossbar and a second leg of dimension to fit within the flanges of said siderail in any of said preselected orientations to define a cross member having an overall length determined by the amount of overlap established between said crossbar and the respective L-shaped channel end members.

6. The article of claim 5, in which the L-shaped channel end members each have a first longer leg and a second shorter leg and are secured to said crossbar by similar ones of their respective legs.

7. The article of claim 5, in which the web and one of the flanges of the crossbar is provided with a central concave portion, the location of which with respect to said siderails being determined by the amount of overlap between said crossbar and said end members to provide clearance for vehicle chassis parts supported by said frame in any of said preselected orientations.

8. The article of claim 5, and combined therewith a second crossmember attached back-to-back to define a single, wider and stronger crossmember.

9. The article of claim 1, wherein at least one of said angled leg portions comprises a removable channel member which is connectable within said channel crossbar with varied amounts of overlap to define a crossmember of adjustable overall length.

References Cited

UNITED STATES PATENTS 2,843,231 7/1958 Maruhn _____ 280—160 X
1,954,078 4/1934 Grief _____ 280—160
1,928,942 10/1933 Maddock _____ 280—160

PHILIP GOODMAN, Primary Examiner